United States Patent
Gao et al.

(10) Patent No.: US 9,507,759 B2
(45) Date of Patent: Nov. 29, 2016

(54) METHOD AND SYSTEM FOR REUSING HTML CONTENT

(71) Applicant: INTERNATIONAL BUSINESS MACHINES CORPORATION, Armonk, NY (US)

(72) Inventors: Chun Feng Gao, Shanghai (CN); Yin Qian, Shanghai (CN); Deng Peng Zhou, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 832 days.

(21) Appl. No.: 13/683,152

(22) Filed: Nov. 21, 2012

(65) Prior Publication Data

US 2013/0139050 A1    May 30, 2013

(30) Foreign Application Priority Data

Nov. 30, 2011    (CN) .......................... 2011 1 0391155

(51) Int. Cl.
    G06F 17/22     (2006.01)
    G06F 17/21     (2006.01)
    G06F 17/30     (2006.01)

(52) U.S. Cl.
    CPC ......... *G06F 17/2247* (2013.01); *G06F 17/218* (2013.01); *G06F 17/2229* (2013.01); *G06F 17/30867* (2013.01)

(58) Field of Classification Search
    CPC ............. G06F 17/2809; G06F 17/218; G06F 17/2247
    See application file for complete search history.

(56) References Cited

U.S. PATENT DOCUMENTS

| | | | |
|---|---|---|---|
| 6,829,746 B1 * | 12/2004 | Schwerdtfeger et al. | 715/239 |
| 7,805,670 B2 | 9/2010 | Lipton et al. | |
| 8,166,054 B2 * | 4/2012 | Fu | G06F 17/30938 707/755 |
| 8,375,296 B2 * | 2/2013 | Kalasapur et al. | 715/235 |
| 8,413,061 B2 * | 4/2013 | Sawant | G06F 17/30896 715/239 |
| 8,489,605 B2 * | 7/2013 | Ayoub et al. | 707/737 |
| 8,533,684 B2 * | 9/2013 | Brunet et al. | 717/128 |
| 8,954,457 B2 * | 2/2015 | Fablet | G06F 17/2247 707/757 |
| 2001/0039540 A1 * | 11/2001 | Hofmann | G06F 9/541 |
| 2005/0022115 A1 * | 1/2005 | Baumgartner et al. | 715/513 |
| 2007/0143672 A1 * | 6/2007 | Lipton et al. | 715/530 |
| 2008/0301766 A1 * | 12/2008 | Makino et al. | 726/1 |
| 2009/0327858 A1 | 12/2009 | Tsun et al. | |
| 2010/0037150 A1 * | 2/2010 | Sawant | G06F 17/30896 715/753 |
| 2010/0077321 A1 | 3/2010 | Shen et al. | |
| 2011/0185017 A1 | 7/2011 | Rezaiifar | |
| 2011/0302285 A1 * | 12/2011 | D'Angelo et al. | 709/222 |
| 2011/0302485 A1 * | 12/2011 | D'Angelo et al. | 715/234 |

(Continued)

FOREIGN PATENT DOCUMENTS

| | | |
|---|---|---|
| CN | 1987850 A | 6/2007 |
| CN | 101089856 A | 12/2007 |

(Continued)

*Primary Examiner* — Maikhanh Nguyen
(74) *Attorney, Agent, or Firm* — Cuenot, Forsythe & Kim, LLC

(57) ABSTRACT

Reusing HyperText Markup Language (HTML) content includes receiving, using a processor, a HyperText Transfer Protocol (HTTP) request; determining that the received HTTP request has a special parameter that specifies to request part of the HTML content; acquiring the part of the HTML content according to the special parameter; and outputting the acquired part of the HTML content.

15 Claims, 3 Drawing Sheets

(56) References Cited

U.S. PATENT DOCUMENTS

2012/0005211 A1* 1/2012 Ayoub et al. ............... 707/737
2012/0110384 A1* 5/2012 Brunet et al. ................ 714/37
2012/0110437 A1* 5/2012 Pan et al. .................... 715/235
2012/0330984 A1* 12/2012 Fablet ................ G06F 17/2247
　　　　　　　　　　　　　　　　　　　　　　　　707/755

FOREIGN PATENT DOCUMENTS

| CN | 101620621 A | 1/2010 |
| CN | 101763425 A | 6/2010 |
| CN | 102124481 A | 7/2011 |
| CN | 102214098 A | 10/2011 |

* cited by examiner

METHOD AND SYSTEM FOR REUSING HTML CONTENT

CROSS-REFERENCE TO RELATED APPLICATIONS

This application claims the benefit of China Application Number 201110391155.9 filed on Nov. 30, 2011, which is fully incorporated herein by reference.

BACKGROUND

When a developer is developing a web application, often there is a need to reuse existing resources. A widget is an example of such an existing resource. To enable existing resources to be reused by other web pages, it is necessary for a resource provider to provide a common application program interface (API) for resources so as to be used by the developer. However, for the resource provider, providing a common API takes additional cost, therefore, in some cases, the resource provider often does not provide a common API. In case the resource provider does not provide a common API, it is difficult to reuse these resources.

BRIEF SUMMARY

According to an embodiment of the disclosure, there is provided a method for reusing HTML content. The method includes receiving a HyperText Transfer Protocol (HTTP) request; determining, using a processor, that the received HTTP request has a special parameter that specifies to request part of the HTML content; acquiring the part of the HTML content according to the special parameter; and outputting the acquired part of the HTML content.

According to an embodiment of the disclosure, there is provided a system for reusing HTML content. The system includes a processor programmed to initiate executable operations. The executable operations include receiving an HTTP request; determining that the received HTTP request has a special parameter that specifies to request part of the HTML content; acquiring the part of the HTML content according to the special parameter; and outputting the acquired part of the HTML content.

According to an embodiment of the disclosure, there is provided a computer program product for reusing HyperText Markup Language (HTML) content. The computer program product includes a computer readable storage medium having program code embodied therewith. The program code is executable by a processor to perform a method. The method includes receiving, using the processor, a HyperText Transfer Protocol (HTTP) request; determining, using the processor, that the received HTTP request has a special parameter that specifies to request part of the HTML content; and acquiring, using the processor, the part of the HTML content according to the special parameter. The acquired part of the HTML content is output using the processor.

BRIEF DESCRIPTION OF THE SEVERAL VIEWS OF THE DRAWINGS

The disclosure may be better understood by referencing the following description given in conjunction with accompany drawings, in which same or similar reference number represents same or similar part throughout the drawings. The drawings are included in the description along with the following detailed description and constituted a part thereof, and are further used to illustrate preferred embodiments of the disclosure and explain principle and advantages of the disclosure, in which.

DETAILED DESCRIPTION

The embodiments of the invention relate to internet information processing and, more particularly, to reusing HyperText Markup Language (HTML) content.

The above defects in the art have been recognized in exemplary embodiments of the disclosure. Thus, the disclosure provides a technical solution that overcomes one or more of the above defects in the art.

Embodiments of the disclosure will be described below in conjunction with accompany drawings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Figure 1:
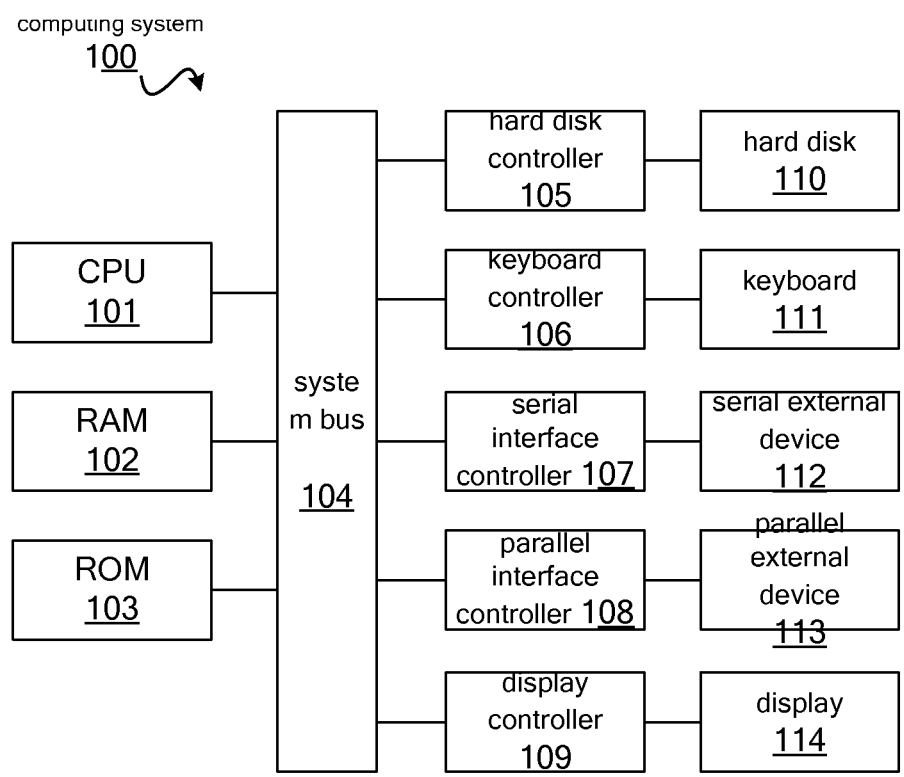
FIG. 1 shows a block diagram of an illustrative computing system adapted to implement an embodiment of the disclosure.

FIG. 1 shows a block diagram of an illustrative computer system 100 adapted to implement an embodiment of the disclosure. As shown, the computer system 100 may include: CPU (central processing unit) 101, RAM (random access memory) 102, ROM (read only memory) 103, system bus 104, hard disk controller 105, keyboard controller 106, serial interface controller 107, parallel interface controller 108, display controller 109, hard disk 110, keyboard 111, serial external device 112, parallel external device 113 and display 114. In these devices, system bus 104 is coupled with CPU 101, RAM 102, ROM 103, hard disk controller 105, keyboard controller 106, serial interface controller 107, parallel interface controller 108, and display controller 109. Hard disk 110 is coupled with hard disk controller 105, keyboard 111 is coupled with keyboard controller 106, serial external device 112 is coupled with serial interface controller 107, parallel external device 113 is coupled with parallel interface controller 108, and display 114 is coupled with display controller 109. It should be appreciated that, the structural block diagram depicted in FIG. 1 is merely for purposes of illustration, not for limiting the scope of the invention. In some circumstances, some devices may be added or removed as needed.

Figure 2:
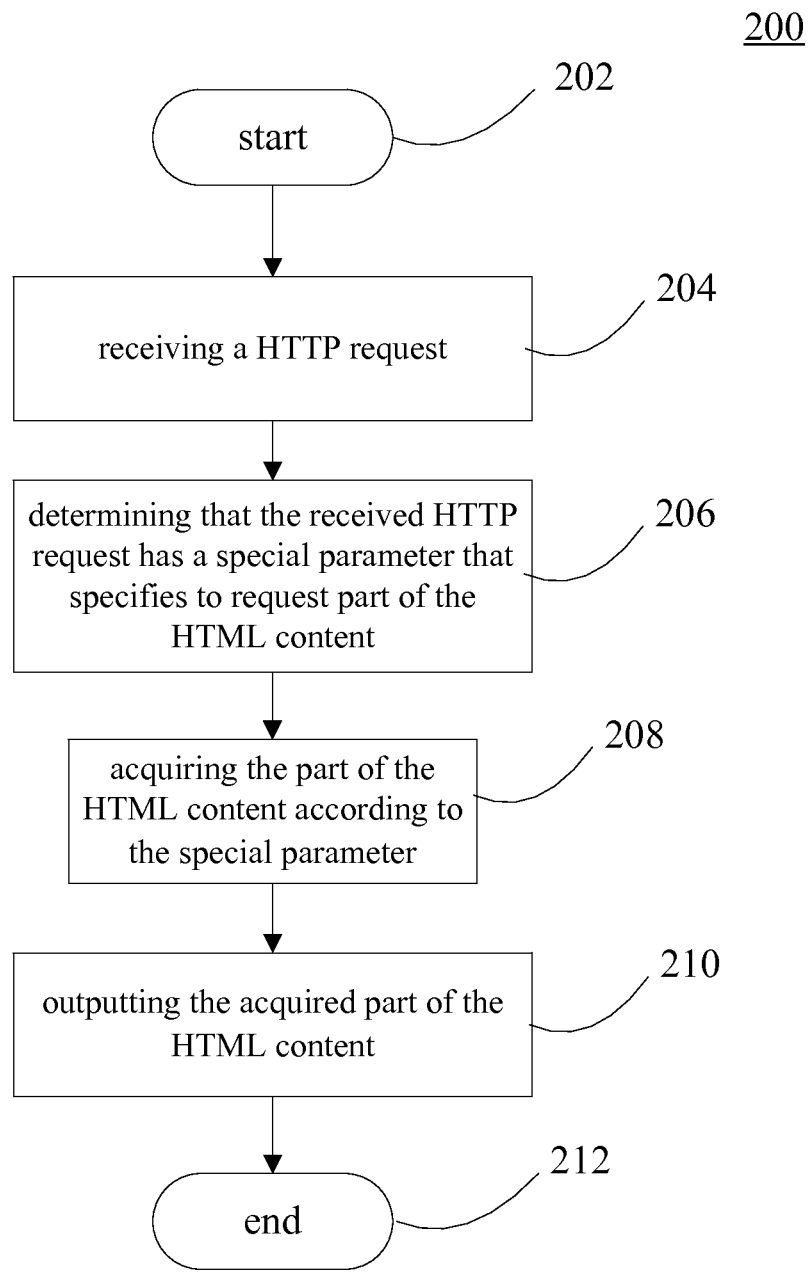
FIG. 2 shows a flowchart of a method for reusing HTML content according to an embodiment of the disclosure.

Now referring to FIG. 2, in which a flowchart of a method 200 for reusing HTML content according to an embodiment of the disclosure is shown. The method 200 starts with step 202.

Next, the method 200 proceeds to step 204, where a HyperText Transfer Protocol (HTTP) request is received. An HTTP request sent from a browser at client side may be received by a server. The browser at client side may be any browser known in the art, such as, Microsoft® Internet Explorer®, Apple® Safari® and so on.

Next, the method 200 proceeds to step 206, where it is determined that the received HTTP request has a special parameter that specifies to request part of the HTML content. According to an embodiment of the disclosure, the special parameter that may exist in the received HTTP request that specifies to request part of the HTML content includes DOM node identifier, that is, the HTTP request does not request the entire page, rather, it requests HTML content corresponding to the DOM node identifier in the special parameter. According to an embodiment of the disclosure, the special parameter that may exist in the received HTTP request that specifies to request part of the HTML content also includes XPath, that is, the HTTP request does not request the entire page, rather, it requests HTML content corresponding to the DOM node identifier and XPath in the special parameter. It is appreciated by those skilled in the art that, any other manners in the art may be used to specify the requested part of the HTML content, and they will not be described respectively.

Next, the method 200 proceeds to step 208, where the part of the HTML content is acquired according to the special parameter. According to an embodiment of the disclosure, after DOM node identifier included in the special parameter is acquired, corresponding part of the HTML content may be acquired according to the acquired DOM node identifier. According to an embodiment of the disclosure, after DOM node identifier and XPath included in the special parameter are acquired, corresponding part of the HTML content may be acquired according to the acquired DOM node identifier and XPath. The DOM node identifier and XPath included in the special parameter may be acquired by parsing the received HTTP request.

Next, the method 200 proceeds to step 210, where the acquired part of the HTML content is outputted.

It will be described below in conjunction with detailed example. It is appreciated that, various limitations added below are merely for illustration, rather than for limiting the protection scope of claims.

First, the following HTTP request is received, for example:

http://w3.ibm.com/
   index.html?partial_domNodeIDs=hotLinksDiv

By parsing this HTTP request, it is determined that it contains therein a special parameter that specifies to request part of the HTML content, i.e., partial_domNodeIDs=hotLinksDiv. Then, by parsing this HTTP request, DOM node identifier included in the special parameter is acquired, i.e. domNodeIDs=hotLinksDiv, that is, DOM node whose node identifier is hotLinksDiv. Then, corresponding part of the HTML content is acquired according to the DOM node identifier; in particular, DOM node tree structure of the entire static page may be acquired according to w3.ibm.com/index.html first. For example, page content is as follows:

```
<html>
    <head>
    // content of head
    </head>
    <body>
        <div id="section1">
        // contents of div
        </div>
        <div id="hotLinksDiv">
            //contents
            <div id="childdiv">
            // contents of child div
            </div>
            <table id="childtable">
            // contents of child table
            </table>
        </div>
        <div id="section2">
        </div>
        // contents of other dom nodes
    </body>
</html>
```

Location where the DOM node resides and its corresponding type (such as, div, table and so on) are acquired by scanning the entire page content according to the acquired DOM node identifier domNodeIDs=hotLinksDiv. In the above example, the DOM node is at position where underline is shown, and its corresponding type is div.

Further, start position and end position of the node are determined according to the acquired position where the DOM node is and its corresponding type. They are indicated by bold in the above example.

Then, content between the start position and end position of the node is acquired as part of the HTML content requested by the HTTP request. In the above example, it is the following codes:

```
<div id="hotLinksDiv">
    //contents
    <div id="childdiv">
    // contents of child div
    </div>
    <table id="childtable">
    // contents of child table
    </table>
</div>
```

According to an embodiment of the disclosure, the part of the HTML content may include cascading style sheet(s) (CSS), and acquiring the part of the HTML content according to the special parameter further includes: acquiring DOM node identifier included in the special parameter; acquiring CSS content corresponding to the DOM node identifier included in the special parameter; transforming the acquired CSS content into direct style attribute of corresponding HTML element; applying the transformed direct style attribute of the HTML element to the part of the HTML content corresponding to the acquired DOM node identifier. The above procedure will be described below in conjunction with detailed example.

The above procedure will be described by taking the following page content as an example.

```
<html>
    <head>
        <style>
            #div1{
                background-color: red;
            }
            #div2{
                background-color: green;
            }
        </style>
    </head>
    <body>
        <div id = "div1">
            content of div1
        </div>
            <div id = "div2">
                content of div2
            </div>
    </body>
</html>
```

First, DOM node identifier included in the special parameter is acquired, here, it is assumed that the DOM node identifier included in the special parameter is div 1. Then, CSS content related to HTML content is acquired by scanning page content. It may be seen that, CSS content corresponding to DOM node whose node identifier is div 1 is shown by underlined portion.

```
<style>
    #div1{
        background-color: red;
    }
    #div2{
        background-color: green;
    }
</style>
```

Then, the acquired CSS content is transformed into direct style attribute of corresponding HTML element. In the above example, the transformed direct style attribute of corresponding HTML element at the above underlined portion is background-color: red;

Finally, the transformed direct style attribute of HTML element is applied to the part of the HTML content corresponding to the acquired DOM node identifier. In the above example, after the transformed direct style attribute "background-color: red" of corresponding HTML element is applied to the part of the HTML content corresponding to the DOM node whose node identifier is div 1, the result is shown as follows.

```
<div id = "div1" style="background-color: red;">
    content of div1
</div>
```

According to an embodiment of the disclosure, the part of the HTML content may include JavaScript, and acquiring the part of the HTML content according to the special parameter further includes: acquiring DOM node identifier included in the special parameter; acquiring a corresponding JavaScript method list according to the acquired DOM node identifier; acquiring invocation path of JavaScript according to JavaScript method list. First, corresponding DOM node may be acquired according to the acquired DOM node identifier and a JavaScript method list registered on that DOM is acquired. Then, starting from the acquired JavaScript method list, invocation path of JavaScript is acquired. The invocation path of JavaScript includes all JavaScript method lists on the invocation path starting from the acquired JavaScript method list and all DOM nodes related to these JavaScript methods. The above procedure will be described below in conjunction with detailed example.

Generally, there are two manners to register an event with DOM node:

(1) writing the event directly into attribute of the DOM node, for example:

<button id="btn1" onclick="fun1( );"> </button>

(2) writing the event into the DOM node by using JavaScript, for example:

```
<button id="btn1">
</button>
<script>
    document.getElementById('btn1').onclick = func1;
</script>
```

First, DOM node identifier included in the special parameter is acquired. According to an embodiment of the disclosure, an event registered in the first manner may be acquired according to the acquired DOM node identifier, and a JavaScript method list 1 directly written into attribute of DOM node is further acquired. According to an embodiment of the disclosure, an event registered in the second manner may be acquired according to the acquired DOM node identifier, and a JavaScript method list 2 written by JavaScript method invocation is further acquired. According to an embodiment of the disclosure, a completed initial JavaScript method list may be obtained by combining the method list 1 and the method list 2. It should be appreciated that, there may only exist method list 1 or method list 2, or both of them may exist.

Next, invocation path of JavaScript is acquired according to the JavaScript method list. Take the following JavaScript for example. Assuming that fun1( ) is included in JavaScript method list obtained according to the acquired DOM node identifier, then starting from fun1( ), the invocation path of JavaScript is acquired. It may be seen that, fun1( ) invokes fun2( ), while fun2( ) does not invoke any other method. Further, for each method fun1( ) and fun2( ), DOM nodes related to each method are acquired. That is, the invocation path of JavaScript includes all JavaScript method lists and all related DOM nodes. As for the above example, the acquired invocation path of JavaScript includes JavaScript method fun1( ) and JavaScript method fun2( ) and all DOM nodes related to fun1( ) and fun2( ).

```
<script>
    function fun1( ){var dom1 =
  document.getElementById('otherDiv').previousSibling;
        dom1.innerHTML = 'new content';
        fun2( );
    }
    function fun2( ){
    }
</script>
```

According to an embodiment of the disclosure, dependency in the invocation path of JavaScript may be verified according to the acquired DOM node identifier, wherein dependency refers to whether the requested part of the HTML content depends on the un-requested part of the HTML content; and the verified JavaScript is outputted. Take following page content for example.

Assuming that there is HTTP request 1 and HTTP request 2 for the following page content respectively, wherein special parameter in HTTP request 1 includes DOM node identifier targetDiv1, and special parameter in HTTP request 2 includes DOM node identifier targetDiv2.

```
<html>
    <body>
        <div id="targetDiv1" onmouseover="fun1( );">
            This is the content for reuse.
        </div>
            <div id="otherDiv"></div>
    </body>
    <script>
        function fun1( ){
            var dom1 =
document.getElementById('otherDiv').previousSibling;
            dom1.innerHTML = 'new content';
        }
    </script>
        <div id="targetDiv2" onmouseover="fun2( );">
            This is the content for reuse.
        </div>
        <div id="otherDiv2"></div>
    <script>
        function fun2( ){
            var otherDomNode =
            document.getElementById('otherDiv');
            otherDomNode.innerHTML = 'new content';
        }
    </script>
</html>
```

First, for HTTP request 1, corresponding invocation path of JavaScript func1( ) and its related DOM node document.body are obtained according to node identifier targetDiv1. Then, when verifying that invocation path of JavaScript by using the node identifier targetDiv1, it is found that the related DOM node document.body is just used to locate itself, that is, fun1( ) does not depend on un-requested part of the HTML content and thus it can pass verification. Then, the verified JavaScript is outputted, namely,

```
<div id="targetDiv1" onmouseover="fun1( );">
        This is the content for reuse.
        </div>
            <div id="otherDiv"></div>
    <script>
        function fun1( ){
var dom1 = document.getElementById('otherDiv').previousSibling;
dom1.innerHTML ='new content';
        }
    </script>
```

Then, for HTTP request 2, corresponding invocation path of JavaScript func2( ) and its related DOM node otherDiv are obtained according to the node identifier targetDiv2. Then, when verifying that invocation path of JavaScript by using the node identifier targetDiv2, it is found that the related DOM node with identifier otherDiv belongs to un-requested part of the HTML content, that is, fun2( ) depends on un-requested part of the HTML content and thus it cannot pass verification. Alternatively, for the invocation path of JavaScript that cannot pass verification, an alert may be returned to user, prompting to the user that this part of the HTML content cannot be reused separately.

Figure 3:
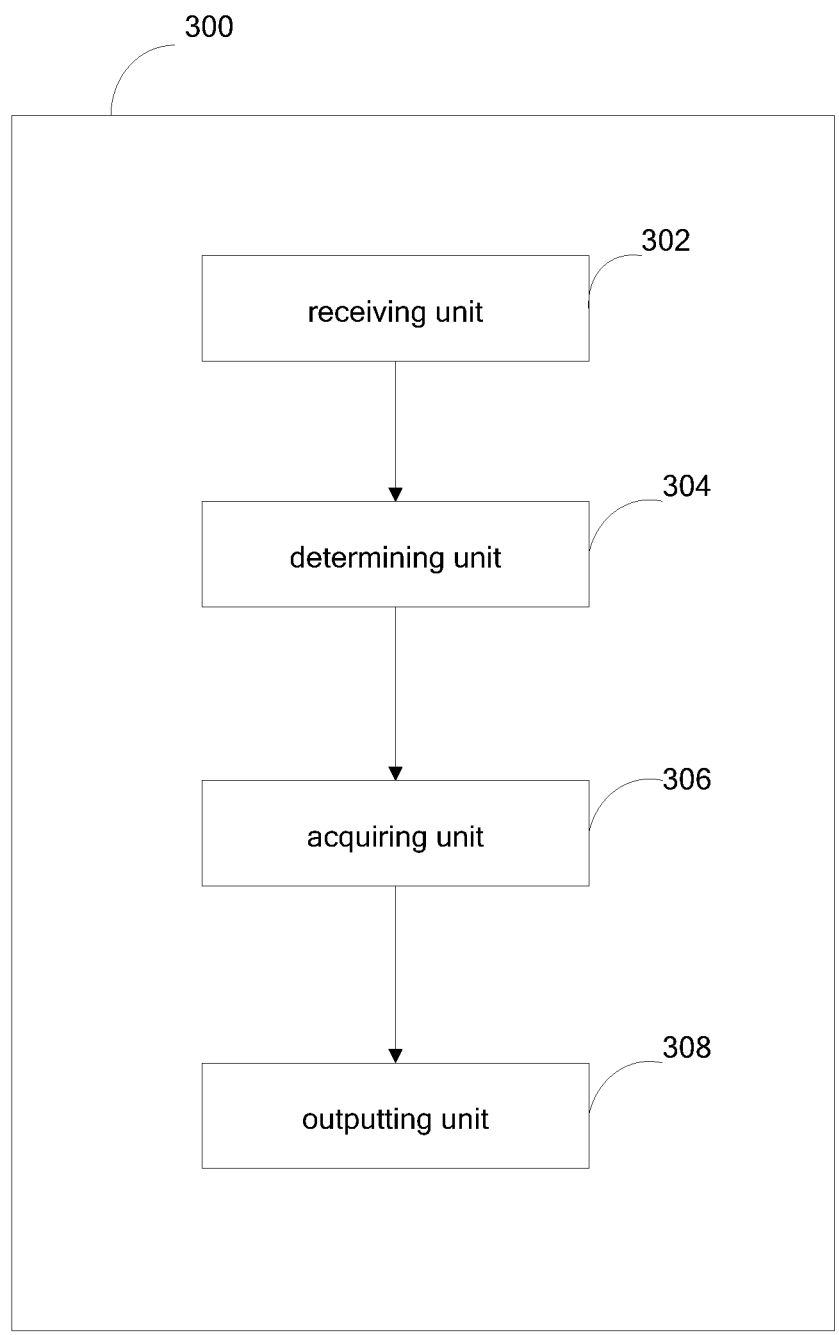
FIG. 3 shows a block diagram of a system for reusing HTML content according to an embodiment of the disclosure.

Now referring to FIG. 3, a block diagram of a system 300 for reusing HTML content according to an embodiment of the disclosure is shown. The system 300 includes: a receiving unit 302 configured to receive a HTTP request; a determining unit 304 configured to determine that the received HTTP request has a special parameter that specifies to request part of the HTML content; an acquiring unit 306 configured to acquire the part of the HTML content according to the special parameter; an outputting unit 308 configured to output the acquired part of the HTML content.

According to an embodiment of the disclosure, the special parameter may include DOM node identifier, wherein, the acquiring unit is further configured to: acquire a DOM node identifier included in the special parameter; and acquire corresponding part of the HTML content according to the acquired DOM node identifier. According to an embodiment of the disclosure, the special parameter may include XPath, wherein, the acquiring unit is further configured to: acquire a DOM node identifier and an XPath included in the special parameter; acquire corresponding part of the HTML content according to the acquired DOM node identifier and XPath.

According to an embodiment of the disclosure, the part of the HTML content includes CSS, the acquiring unit is further configured to: acquire a DOM node identifier included in the special parameter; acquire CSS content corresponding to the DOM node identifier included in the special parameter; transform the acquired CSS content into direct style attribute of corresponding HTML element; apply the transformed direct style attribute of the HTML element to the part of the HTML content corresponding to the acquired DOM node identifier.

According to an embodiment of the disclosure, the part of the HTML content includes JavaScript, the acquiring unit is further configured to: acquire a DOM node identifier included in the special parameter; acquire a corresponding JavaScript method list according to the acquired DOM node identifier; acquire invocation path of JavaScript according to the JavaScript method list.

According to an embodiment of the disclosure, the system 300 further includes a verifying unit (not shown) configured to verify dependency in the invocation path of JavaScript according to the acquired DOM node identifier, wherein dependency refers to whether the requested part of the HTML content depends on the un-requested part of the HTML content.

According to an embodiment of the disclosure, the outputting unit is further configured to output the verified JavaScript.

With the above one or more embodiments of the disclosure, it is possible to reuse resources in case that provider of the resources has not provided a common API. Meanwhile, since there is no need to provide a common API, provider of the resources may also save cost.

The method and system according to embodiments of the disclosure have been described in detail above. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or any combination thereof. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination thereof. In the context of this document, a computer-readable medium may be any tangible medium that can contain, store the program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wired, optical fiber cable, RF, etc., or any suitable combination of the foregoing.

Computer program code for carrying out operations of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is to be noted that, in the apparatus and method of the disclosure, respective components and steps can be decomposed and/or recombined. Such decomposition and/or recombination should be considered as equivalent solution of the disclosure. Further, steps for carrying out the above series of processes may be performed according the mentioned order naturally in time sequence, but not necessarily in time sequence. Some steps may be performed in parallel or independently with each other.

Although the disclosure and its advantages have been described in detail, it should be appreciated that various modifications, replacements and changes may be made without departing from the spirit and scope defined by the appended claims. Further, the terms "including", "containing" or any other variants are intended to encompass non-exclusive inclusion, such that process, method, object or means containing a series of elements include not only those elements, but also other elements not explicitly listed, or elements that are inherent to the process, method, object or means. Without further limitation, an element that is defined by phrase "including a . . . " does not exclude that same additional element also exists in the process, method, object or means that contain that element.

What is claimed is:

1. A method for reusing HyperText Markup Language (HTML) content, comprising:
receiving a HyperText Transfer Protocol (HTTP) request;
determining, using a processor, that the received HTTP request has a special parameter that specifies to request part of the HTML content;
acquiring the part of the HTML content according to the special parameter; and
outputting the acquired part of the HTML content, wherein the special parameter includes a DOM node identifier, wherein the part of the HTML content includes cascading style sheets (CSS), and wherein acquiring the part of the HTML content according to the special parameter further comprises:
  acquiring a DOM node identifier included in the special parameter;
  acquiring CSS content corresponding to the DOM node identifier included in the special parameter;
  transforming the acquired CSS content into direct style attribute of corresponding HTML element; and
  applying the transformed direct style attribute of the HTML element to the part of the HTML content corresponding to the acquired DOM node identifier.

2. The method according to claim 1, wherein acquiring the part of the HTML content according to the special parameter further comprises:
  acquiring a DOM node identifier included in the special parameter; and
  acquiring a corresponding part of the HTML content according to the acquired DOM node identifier.

3. The method according to claim 1, wherein the special parameter further includes XPath.

4. The method according to claim 3, wherein acquiring the part of the HTML content according to the special parameter further comprises:
  acquiring a DOM node identifier and a XPath included in the special parameter; and
  acquiring corresponding part of the HTML content according to the acquired DOM node identifier and XPath.

5. The method according to claim 1, wherein the part of the HTML content includes JavaScript, and wherein acquiring the part of the HTML content according to the special parameter further comprises:
  acquiring a DOM node identifier included in the special parameter;
  acquiring a corresponding JavaScript method list according to the acquired DOM node identifier; and
  acquiring invocation path of JavaScript according to the JavaScript method list.

6. The method according to claim 5, further comprising:
  verifying dependency in the invocation path of JavaScript according to the acquired DOM node identifier, wherein dependency refers to whether the requested part of the HTML content depends on the un-requested part of the HTML content.

7. The method according to claim 6, further comprising:
  outputting the verified JavaScript.

8. A system for reusing HyperText Markup Language (HTML) content, comprising:
  a processor programmed to initiate executable operations comprising:
    receiving a HyperText Transfer Protocol (HTTP) request;
    determining, using a processor, that the received HTTP request has a special parameter that specifies to request part of the HTML content;
    acquiring the part of the HTML content according to the special parameter; and
    outputting the acquired part of the HTML content, wherein the special parameter includes a DOM node identifier,
    wherein the part of the HTML content includes cascading style sheets (CSS), and wherein acquiring the part of the HTML content according to the special parameter further comprises:
      acquiring a DOM node identifier included in the special parameter;
      acquiring CSS content corresponding to the DOM node identifier included in the special parameter;
      transforming the acquired CSS content into direct style attribute of corresponding HTML element; and
      applying the transformed direct style attribute of the HTML element to the part of the HTML content corresponding to the acquired DOM node identifier.

9. The system according to claim 8, wherein acquiring the part of the HTML content according to the special parameter further comprises:
  acquiring a DOM node identifier included in the special parameter; and
  acquiring a corresponding part of the HTML content according to the acquired DOM node identifier.

10. The system according to claim 8, wherein the special parameter further includes XPath.

11. The system according to claim 10, wherein acquiring the part of the HTML content according to the special parameter further comprises: acquiring a DOM node identifier and a XPath included in the special parameter; and acquiring corresponding part of the HTML content according to the acquired DOM node identifier and XPath.

12. The system according to claim 8, wherein the part of the HTML content includes JavaScript, and wherein acquiring the part of the HTML content according to the special parameter further comprises:
  acquiring a DOM node identifier included in the special parameter;
  acquiring a corresponding JavaScript method list according to the acquired DOM node identifier; and
  acquiring invocation path of JavaScript according to the JavaScript method list.

13. The system according to claim 12, wherein the processor is further configured to initiate an executable operation comprising:
  verifying dependency in the invocation path of JavaScript according to the acquired DOM node identifier, wherein dependency refers to whether the requested part of the HTML content depends on the un-requested part of the HTML content.

14. The system according to claim 13, wherein the processor is further configured to initiate an executable operation comprising:
  outputting the verified JavaScript.

15. A computer program product for reusing HyperText Markup Language (HTML) content, the computer program product comprising a computer readable hardware storage device having program code embodied therewith, the program code executable by a processor to perform a method comprising:
  receiving, using the processor, a HyperText Transfer Protocol (HTTP) request;
  determining, using the processor, that the received HTTP request has a special parameter that specifies to request part of the HTML content;
  acquiring, using the processor, the part of the HTML content according to the special parameter; and
  outputting, using the processor, the acquired part of the HTML content,
  wherein the part of the HTML content includes cascading style sheets (CSS), and wherein acquiring the part of the HTML content according to the special parameter further comprises:

acquiring a DOM node identifier included in the special parameter;
acquiring CSS content corresponding to the DOM node identifier included in the special parameter;
transforming the acquired CSS content into direct style attribute of corresponding HTML element; and
applying the transformed direct style attribute of the HTML element to the part of the HTML content corresponding to the acquired DOM node identifier.

* * * * *